United States Patent [19]

Moertel

[11] 4,182,600
[45] Jan. 8, 1980

[54] SLIDE FASTENING ELEMENT APPARATUS

[75] Inventor: George B. Moertel, Conneautville, Pa.

[73] Assignee: Textron, Inc., Providence, R.I.

[21] Appl. No.: 801,255

[22] Filed: May 27, 1977

Related U.S. Application Data

[62] Division of Ser. No. 601,787, Aug. 4, 1975, Pat. No. 4,084,296.

[51] Int. Cl.² .............................................. B28F 1/10
[52] U.S. Cl. ................................ 425/129 R; 425/545; 425/814
[58] Field of Search .................... 425/545, 814, 126 R, 425/123, 115, 122, 129 R; 249/141

[56] References Cited

U.S. PATENT DOCUMENTS

| | | | |
|---|---|---|---|
| 2,511,402 | 6/1950 | Firing | 425/545 X |
| 3,445,915 | 5/1969 | Cuckson et al. | 425/545 X |
| 3,483,288 | 12/1969 | Paulson | 249/141 X |

FOREIGN PATENT DOCUMENTS 533711  2/1941  United Kingdom ..................... 425/814

*Primary Examiner*—William R. Briggs
*Attorney, Agent, or Firm*—O'Brien and Marks

[57] ABSTRACT

An interlocking element for a slide fastener is produced by substantially laminar flow of synthetic polymer resin through one of a pair of leg portions extending from opposite sides of a head portion of the element, through the head portion, and through the other of the pair of leg portions.

3 Claims, 14 Drawing Figures

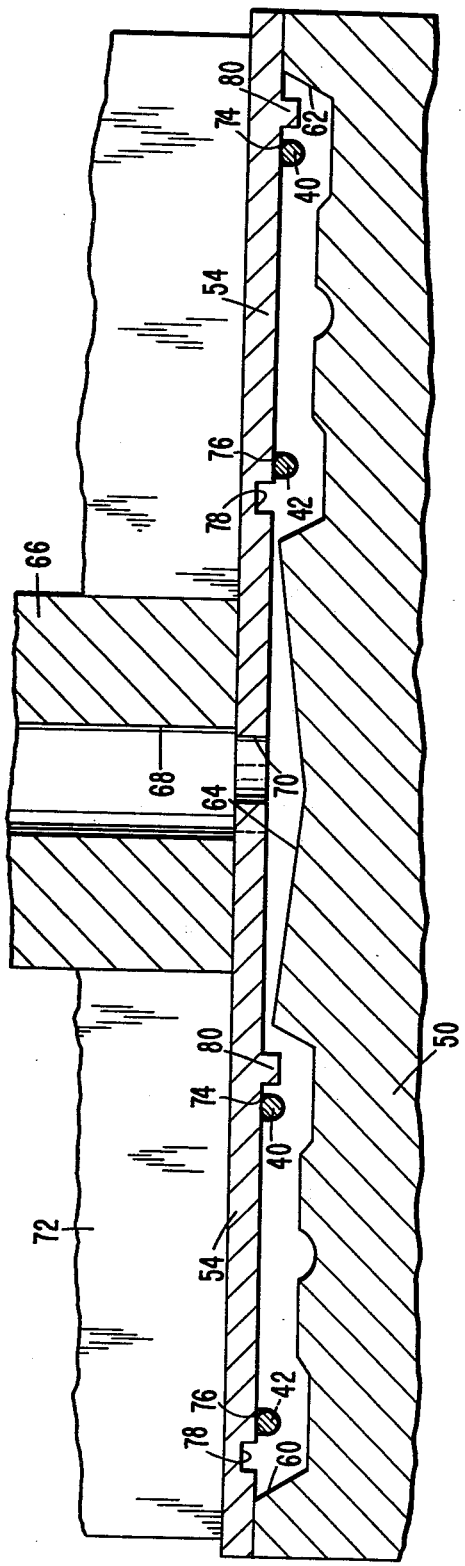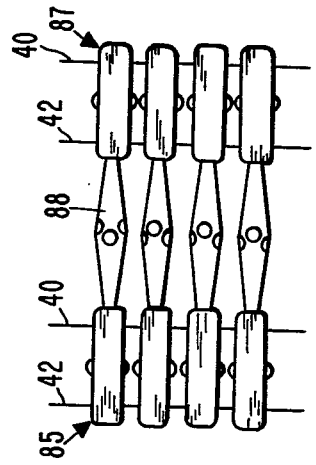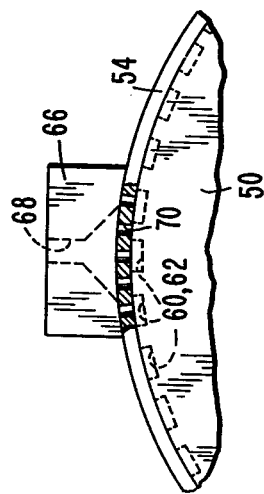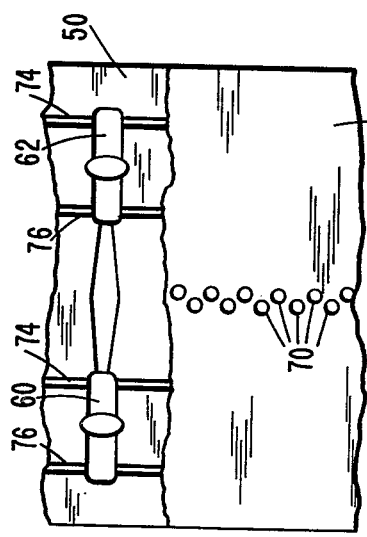

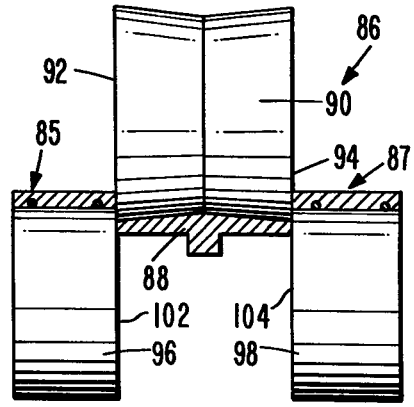
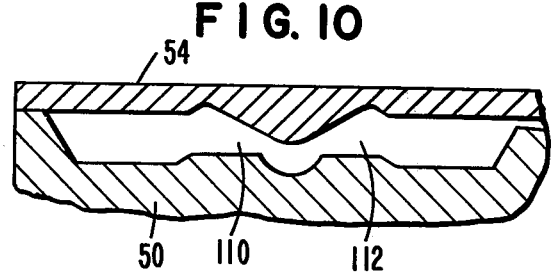
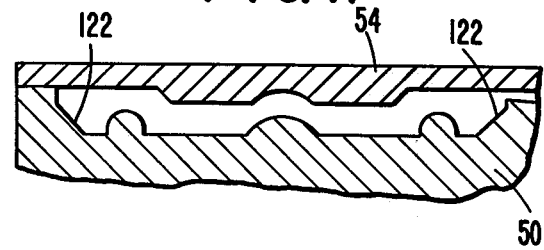
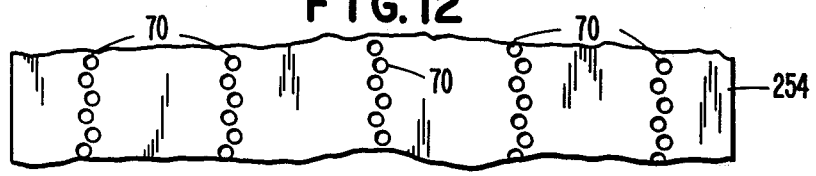
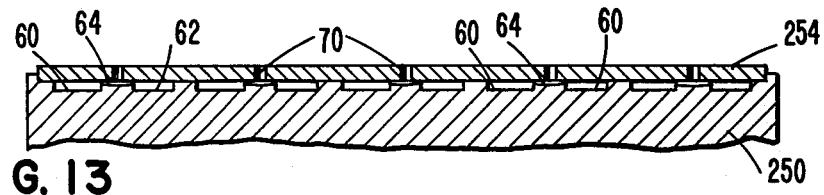
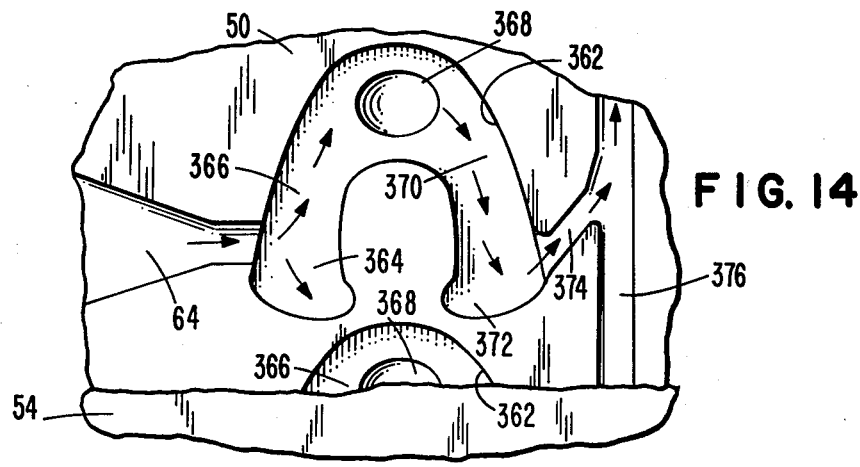

SLIDE FASTENING ELEMENT APPARATUS

CROSS REFERENCE TO RELATED APPLICATION

This is a divisional application of my copending application Ser. No. 601,787 filed Aug. 4, 1975, now U.S. Pat. No. 4,084,296.

BACKGROUND OF THE INVENTION

1. Field of the Invention

The invention relates to slide fasteners and particularly to interlocking elements for slide fasteners, and to methods and apparatus for manufacture of the interlocking elements.

2. Description of the Prior Art

The prior art as exemplified in U.S. Pat. No. 2,496,926, No. 3,179,996, No. 3,328,857, No. 3,414,948, No. 3,445,915, No. 3,487,531 and No. 3,770,862 and British Pat. Nos. 446,336 and 871,458, contains a number of slide fasteners with fastening elements or scoops formed from metal or thermoplastic resins. In forming fastening elements by molding thermoplastics in a continuous cavity wheel, the molten thermoplastic is injected directly from an injection shoe engaging the wheel into cavities defining the fastener elements; such molded fastener elements are often subject to failure and breakage at leg portions adjacent the head portions during use or when folded to form the elements from elongated straight molded bodies.

SUMMARY OF THE INVENTION

The invention is summarized in an interlocking element for a slide fastener comprising a molded elongated body of synthetic polymer resin including a head portion and a pair of leg portions extending from opposite sides of the head portion; said body formed by substantial laminar flow of flowable synthetic polymer resin in a mold cavity sequentially along one of the pair of leg portions, the head portion, and the other of the pair of leg portions, and then hardening the synthetic polymer resin in the cavity.

An object of the invention is to construct an interlocking element for a slide fastener which is less expensive, stronger, and more reliable than prior art fastening elements.

Another object of the invention is to form elements by laminar flow of synthetic polymer resin along the longitudinal dimension of the elements so as to produce substantially greater strength of the elements.

It is also an object of the invention to allow for substantially increased pressure of injecting thermoplastic during the manufacture of thermoplastic fastening elements.

Other objects, advantages and features of the invention will be apparent from the following description taken in conjunction with the accompanying drawings.

BRIEF DESCRIPTION OF THE DRAWINGS

FIG. 5 is a cross section view taken perpendicular to the view of FIG. 4 of an injection molding portion broken away from the apparatus of FIG. 4.

FIG. 6 is a plan view of the injection molding portion of the apparatus of FIGS. 4 and 5.

FIG. 7 is an enlarged elevation view from the same angle as FIG. 4 of the injection molding portion broken away from the apparatus of FIG. 4.

FIG. 8 is a plan view of a pair of trains of fastening elements formed by the apparatus of FIG. 4.

FIG. 9 is a side view of a sprue and runner severing mechanism of the apparatus of FIG. 4.

FIG. 10 is a cross section of a modification of a portion of the apparatus of FIG. 4.

FIG. 11 is a cross section view of another modification of a portion of the apparatus of FIG. 4.

FIG. 12 is a plan view of a portion of one variation of the apparatus of FIG. 4.

FIG. 13 is a cross section view of a portion of the variation of FIG. 2.

FIG. 14 is a plan view of a still further modification of the apparatus of FIG. 4.

DESCRIPTION OF THE PREFERRED EMBODIMENT

Figure 1:
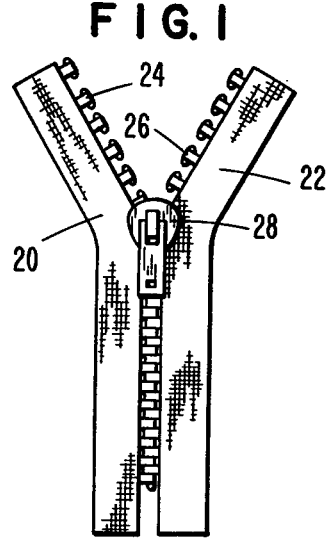
FIG. 1 is a plan view of a slide fastener constructed in accordance with the invention.

As illustrated in FIG. 1 a slide fastener manufactured in accordance with the invention includes a pair of carrier tapes 20 and 22 having respective pluralities of interlocking or fastening elements 24 and 26 suitably secured to inner edges of the tapes 20 and 22. A slider 28 is slidable over the pluralities of interlocking elements 24 and 26 for opening and closing the slide fastener.

Figure 2:
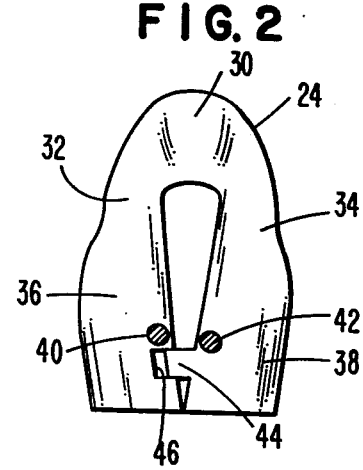
FIG. 2 is an elevation view of a fastening element of the slide fastener of FIG. 1.
Figure 3:
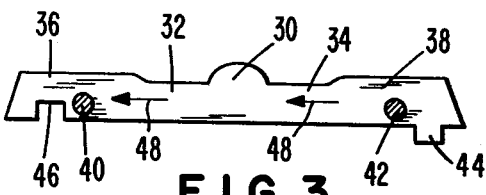
FIG. 3 is a side view of a molded body prior to bending to form the fastener element of FIG. 2.

The fastening elements 24 and 26 are substantially identical, and as shown in FIG. 2, each of the fastening elements has an elongated body with a central enlarged head portion 30, a pair of leg portions 32 and 34 extending from opposite sides of the head portion 30, and terminating at opposite ends in respective enlarged heel portions 36 and 38. Supporting threads 40 and 42 are imbedded in the respective heel portions 36 and 38 which also may be provided with an interlocking opening 46 and projection 44, respectively. As shown in FIG. 3 the bodies of the fastening elements are initially formed with the head portion 30, the pair of leg portions 32 and 34 and the heel portions 36 and 38 extending along a straight line. The elements are bent, mainly in the leg portions 32 and 34 which have a reduced cross section, to make the leg portions 32 and 34 and the heel portions 36 and 38 extend in substantially the same direction from the head portions 30.

The bodies of the fastening elements are molded from a synthetic polymer resin, such as one of the thermoplastic resins, nylon 6, nylon 6—6, polypropylene, polyethylene, polyester and acetal. As illustrated by the arrows 48 in FIG. 3 the molded body of the fastening element 24 is formed by laminar flow (i.e. flow in one direction) of flowable resin material from the heel portion 38 through one leg portion 34, the head portion 30, and the leg portion 32 to the heel portion 36.

Figure 4:
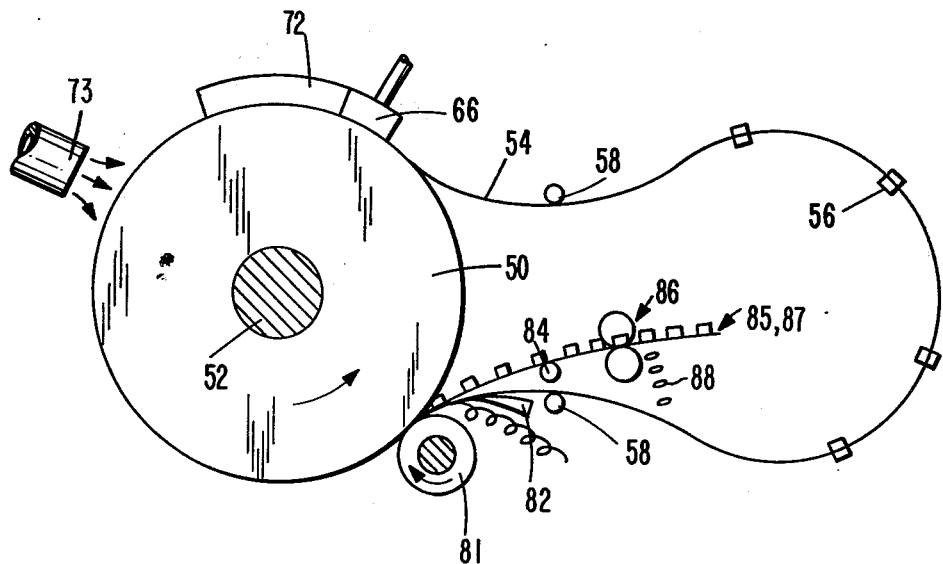
FIG. 4 is an elevation view of an apparatus for forming a train of the molded bodies of FIG. 3.

An apparatus shown in FIG. 4 for manufacturing a pair of trains of the molded bodies of FIG. 3 includes a cavity wheel 50 driven by drive means 52 together with a band, such as a stainless steel band 54, suitably guided by guides 56 and rollers 58 engaging a peripheral portion of the cavity wheel 50 between first and second angular positions of the cavity wheel 50. As shown in FIGS. 5, 6 and 7, the cavity wheel 50 has a pair of spaced rows of fastening element forming cavities 60 and 62 in the outer peripheral surface of the cavity wheel 50. Each of the cavities 60 and 62 have a respective head forming portion, a pair of leg forming portions and a pair of heel forming portions corresponding to the respective head portion 30, leg portions 32 and 34, and heel portions 36 and 38 of the bodies of the fastener elements 24 and 26 shown in FIG. 3. The elongated dimension of the cavities 60 and 62 is parallel to the axis of the cavity wheel 50. A plurality of runner channels 64 are formed between the rows of cavities 60 and 62 with each runner channel 64 extending to inner ends of a pair of the fastening element forming cavities, the pair of cavities formed by one of each of the cavities 60 and 62. The band 54 engaging the outer periphery of the cavity wheel between the first and second angular positions encloses the cavities 60 and 62 and the runners 64. An injection means including an extrudate shoe 66 slidingly engages the outer surface of the band 54 and has a passageway 68 for conducting flowable synthetic polymer resin to staggered openings 70 through the band 54 communicating with the runners 64. A pressure shoe 72 may also be provided to engage the outer periphery of the band 54 to prevent the pressure of flowable injected synthetic polymer resin from lifting the band 54 from the cavity wheel 50. The shoes 66 and 72 are preferably formed from a material which is relatively soft compared to the material of the band 54 such as to reduce wear on the band 54.

Each of the row of cavities 60 and 62 are intersected at right angles in the heel forming portions thereof by a pair of grooves 74 and 76 extending completely around the outer periphery of the wheel 50. The grooves 74 and 76 have a suitable size to accomodate the supporting threads 40 and 42 such that the supporting threads 40 and 42 will be imbedded in polymer resin injected into the respective cavities 60 and 62. Also the band 54 has notches 78 aligned over the cavities 60 and 62 designed to produce the projections 44 on the elements, and has projections 80 extending into each of the cavities 60 and 62 for producing the openings 46 in the elements 24 and 26.

As illustrated particularly in FIG. 5, the central portion of the runner 64 has an enlarged cross section whereas the end portions of the runner 64 communicating with the ends of the cavities 60 and 62 have a narrowed cross section.

A suitably driven band tension roll 81 can be included in the apparatus of FIG. 4 to help maintain the band 54 in tight engagement with the periphery of the cavity wheel 50. A blade 82 is positioned near the exit end of the cavity wheel 50 for engaging the outer surface of the band 54 to sever any skin or flash produced on the outer surface of the band 54 between the extrudate shoe and the band 54. A guide wheel 84 is positioned after the blade 82 to readily separate the molded trains of fastening element bodies, indicated generally at 85 and 87 in FIG. 8, from the band 54. A runner severing mechanism, indicated generally at 86, is positioned after the roller 84. As illustrated in FIG. 9 the runner severing mechanism 86 can include a wheels 90 disposed over the runners 88 and having outer shearing edges 92 and 94 aligned with the inside edges of the respective trains 85 and 87 of fastener element bodies. A pair of wheel 96 and 98 are disposed below the respective trains 85 and 87 and have inside shearing edges 102 and 104 aligned with the edges 92 and 94 for cooperating with the edges 92 and 94 to shear the trains 85 and 87 from the runners 88.

In operation of the apparatus of FIGS. 4, 5, 6, 7 and 9; the cavity wheel 50 is rotated by the drive means 52 while the band 54 is guided by the guides 56 and rollers 58 into engagement with the outer periphery of the wheel 50 to enclose the cavities 60 and 62 and the runners 64 in the portion of the cavity wheel 50 rotating through an angle from the extrudate shoe 66 to the band tension roll 81. Flowable polymer resin applied to the extrudate shoe 66 is injected through the openings 70 in the band 54 to the runners 64 and hence flows into the inner ends of the respective cavities 60 and 62. The flowable synthetic polymer resin flows from the inside end of each of the cavities 60 and 62 sequentially through one of the heel forming portions, one of the leg forming portions, the head forming portion, the other leg forming portion, and finally to the other heel forming portion to produce a laminar flow throughout the length dimension of the cavities 60 and 62.

Utilization of the cover band 54 eliminates wear on the cavity wheel 50 since there is no relative sliding motion of the band 54 on the cavity wheel and the only sliding movement is between the band 54 and the shoes 66 and 72. With shoes 66 and 72 made from a soft material relative to the band 54, wear on the band 54 is reduced since the shoes 66 and 72 operate as sacrificial members. The shoes 66 and 72 can be easily replaced for a relatively small cost when they become too worn. Also the band 54 results in substantially better product control since the closed cavities of the wheel 50 allow relatively high pressure injection of polymer resin into the cavities; this tends to eliminate failure to fill cavities caused by low pressure necessitated by prior art apparatus where injection was made directly from a shoe sliding over the cavities. Also the band 54 prevents the wiping of the resin from the open side of the cavities due to the sliding movement of the shoe 66, and the band 54 allows a less costly design for the shoe 66. Further the band 54 aids in cooling and solidifying thermoplastic resins due to the heat conductivity of the band.

Synthetic polymer resins have long chain molecules which are believed to be oriented during the laminar flow of the plastic resin to produce an orientation of the long chain molecules along the longitudinal dimension of the molded bodies. Additionally the laminar flow of the synthetic polymer resin may result in stratification of the crystalline structure of the polymer resin as it hardens. Such orientation or stratification results in substantially increased tensile strength of the leg portions 32 and 34 along the longitudinal dimension of the fastening elements 24 and 26, FIG. 2, greatly reducing the liklihood of breakage of the leg portions 32 and 34 during folding of the heel portions 36 and 38 toward each other or during use.

The pressure shoe 72 aids in maintaining the cavities closed against the prssure of the injected thermoplastic. Between the extrudate shoe 66 and the exit point at the band tension roll 81, the synthetic polymer resin material is hardened within the cavities 60 and 62. The hardening can be aided by suitable means such as coolant means 73 directing a flow of coolant such as air against the outer periphery of the band 54 to cool a thermoplastic resin in the cavities 60 and 62. The hardened molded bodies within the cavities 60 and 62 interlock the cavity wheel 50 with the band 54 through the projections 80 and notches 78 in the band 54 and through the runner 88 in the channels 64 and gate sprues in the openings 70 to thus pull the band 54 along with the cavity wheel 50.

The tension wheel 81 further aids to maintain tension in the band 54 as it passes beneath the extrudate shoe 66 and pressure shoe 72 through the angle of rotation to the tension roll 81.

When the band 54 disengages the cavity wheel 50 after the tension roll 81, the trains 85 and 87, FIG. 8, and the runners 88 are stripped from the cavities 60 and 62 and channels 64 along with the band 54 since the runners 88 are interlocked by the gate sprues through the openings 70 with flash on the outside of the band 54. After the stripping of the trains 85 and 87 from the wheel 50, the blade 84 removes the flash from the outside surface of the band 54 allowing the trains 85 and 87 to be readily lifted from the band 54 by the roller 84.

At the runner severing mechanism 86 the rotating wheels 90, 96 and 98 mesh to sever the runners 88 from the trains 85 and 87 thus separating them and allowing the trains 85 and 87 to be further processed in a conventional manner to from a slide fastener as shown in FIG. 1.

In FIGS. 10 and 11 there are shown two different modifications of the configuration of the cavities 60; similar modifications to cavities 62 and some repeated details are not shown for sake of brevity. The cavity shown in FIG. 10 has tapered portions 110 and 112 formed by a suitable profile on the band 54 to produce one possible different shape of the leg portions of the fastening elements. In FIG. 11 the inside surface of the band 54 in the cavities is designed to form the outer surface of the elements 24 and 26 while the bottom surface of the cavity is designed to form the inside surfaces of the elements 24 and 26, i.e. turned over from the configuration of FIG. 5. With the configuration of FIG. 11 large undercuts are possible in the inside surface of the elements such as shown at 122.

In FIGS. 12 and 13 there is shown a variation of the apparatus of FIGS. 4, 7 and 9 wherein the cavity wheel 50 is replaced by a cavity wheel 250 and the band 54 is replaced by the band 254. The cavity wheel 250 has several pairs of rows of the cavities 60 and 62 with several rows of the runners 64 connecting to the inner ends of the cavities 60 and 62. A band 254 has a plurality of rows of staggered openings 70 therethrough for communicating with the runners 64 to form several pairs of trains of the fastening elements 24 and 26. Each row of openings 70 may be independently or jointly fed from a molten resin source.

In a still further modification in FIG. 14, the cavities in the cavity wheel 50 are further modified as illustrated by cavities 362 for forming an alternate form of fastening elements or scoops which are to be individual crimped or otherwise attached to the edge of a carrier tape. Each of the runners 64 opens into a respective heel forming end 364 of each cavity 362 to produce laminar flow of the plastic resin material sequentially through a leg forming portion 366, a head forming portion 368, and a leg forming portion 370 to an opposite heel forming portion 372 of the scoop element. Exit channels 374 communicate from the respective heel forming portions 372 to an annular post fill channel 376 parallel to the row of cavities 362 in the periphery of the cavity wheel 54. When the cavity 362 is filled, the apparatus is designed to produce a flow of polymer resin through the exit channel 374 into the post fill channel 376 to join with resin in the post fill channel from a preceding cavity. The exit channel 374 extends at an acute angle to the post fill channel 376 to inject resin into the post fill channel 376 in the direction of movement of the cavity wheel 50.

Since many modifications, variations and changes in detail may be made to the described embodiments, it is intended that all matter in the foregoing description and shown in the drawings be interpreted as illustrative and not in a limiting sense.

What is claimed is:

1. An apparatus for forming a pair of trains of fastening elements comprising a rotatable cavity wheel having a pair of spaced rows of fastening element forming cavities in the periphery of the cavity wheel;

said cavities each having a head forming portion, a pair of leg forming portions extending from opposite sides of the head forming portion, and a pair of heel forming portions in which the leg forming portions terminate;

said head forming portion, leg forming portions, and heel forming portions of each cavity extending in a straight line parallel the axis of the cavity wheel;

a row of runner channels in the periphery of the cavity wheel between the pair of rows of cavities wherein each of the runner channels communicates with one end of a respective cavity of the cavities in each of the pair of rows of cavities;

a cover band of stainless steel engaging the periphery of the cavity wheel over a predetermined arcuate portion between first and second angular positions of the cavity wheel for enclosing the fastening element forming cavities and the runner channels in the cavity wheel;

said band having a row of staggered openings communicating into the runner channels;

two pairs of annular grooves in the periphery of the cavity wheel intersecting at right angles the respective heel forming portions of the cavities for receiving and holding the respective pairs of supporting filaments for the trains of elements;

injection shoe means engaging the cover band and having an injection passageway communicating with the openings in the cover band for injecting a synthetic polymer resin into the runners and cavities;

said injection shoe means formed from a material which is softer than the cover band to form a sacrificial injection shoe means to reduce wear on the cover band;

pressure means engaging the cover band adjacent the injection shoe means to maintain the cover band tightly in engagement with the cavity wheel;

guide means for guiding a portion of the cover band in spaced relationship from the cavity outside of the predetermined arcuate portion;

means positioned after separation of the cover band from the cavity wheel for severing flash from the outside of the cover band;

means positioned after the severing means for separating the pair of trains of fastening elements and runners from the cover band; and means positioned after the separating means for severing the runners from the pair of trains of fastening elements.

2. An apparatus for forming a train of fastening elements comprising a cavity wheel having a row of elongated fastening element forming cavities in the periphery of the cavity wheel, a post fill channel in the periphery of the cavity wheel parallel to and spaced from the row of cavities, a plurality of exit channels communicating from one ends of the cavities, respectively, to the post-fill channel, a cover band engaging the cavity wheel between first and second angular positions of the cavity wheel to enclose the fastening element forming cavities and the channels, and means including runners for injecting flowable synthetic polymer resin into the other ends of the cavities between the first and second angular positions such that the resin flows through the cavities and the exit channels into the post fill channel to connect with resin in the post fill channel from respective preceding cavities to form a connecting runner in the post fill channel for fastening elements formed in the cavities.

3. An apparatus as claimed in claim 2 wherein the exit channels extend at an acute angle to the post-fill channel to inject resin in the post-fill channel in the direction of movement of the cavity wheel.

* * * * *